(12) United States Patent
Chen et al.

(10) Patent No.: US 7,529,888 B2
(45) Date of Patent: May 5, 2009

(54) SOFTWARE CACHING WITH BOUNDED-ERROR DELAYED UPDATE

(75) Inventors: Michael Kerby Chen, Palo Alto, CA (US); Dz-ching Ju, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/993,957

(22) Filed: Nov. 19, 2004

(65) Prior Publication Data

US 2006/0112237 A1 May 25, 2006

(51) Int. Cl.
*G06F 12/00* (2006.01)
(52) U.S. Cl. .................. 711/118; 711/144; 711/156
(58) Field of Classification Search .................. None
See application file for complete search history.

(56) References Cited

U.S. PATENT DOCUMENTS

| | | | |
|---|---|---|---|
| 5,249,284 | A | 9/1993 | Kass et al. |
| 6,370,614 | B1 | 4/2002 | Teoman et al. |
| 2004/0064809 | A1 | 4/2004 | Liu et al. |

OTHER PUBLICATIONS

Dai, Jinquan et al., PCT International Patent Application No. CN2004/000538, entitled "*Automatic Caching Generation in Network Applications*," filed May 26, 2004, 51 pages including figures.
Cooper, Keith D. et al., "*Compiler-Controlled Memory*," Proceedings of the 8th International Conference on Architectural Support for Programming Languages and Operating Systems (ASPLOS-VIII), San Jose, California, Oct. 3-7, 1998, pp. 2-11.
Floyd, Sally et al., "*Random Early Detection Gateways for Congestion Avoidance*," IEEE/ACM Transactions on Networking, vol. 1, No. 4, Aug. 1993, pp. 397-413.
PCT/US05/042334, Written Opinion, Nov. 8, 2006.
PCT/US05/042334, International Search Report, Nov. 8, 2006.
Iyengar, Arun, et al. "Web Caching, Consistency, and Content Distribution," http://web.archive.org/web/20040723190735/http://www.research.ibm.com/people/i/iyengar/handbook_chapter2.pdf, Jul. 2004, pp. 1-21.
Dilley, John, et al. "The Distributed Object Consistency Protocol," http://hplabs.hp.com/techreports/1999/HPL-1999-109.html, Sep. 1999, pp. 1-20.
Bartolini, S et al. "A Proposal for Input-Sensitivity Analysis of Profile-Driven Optimizations on Embedded Applications," ACM SIGARCH Computer Architecture News, Jun. 2004, pp. 70-77, vol. 32, No. 3.

*Primary Examiner*—Alford Kindred
*Assistant Examiner*—Mehdi Namazi
(74) *Attorney, Agent, or Firm*—Joni D. Stutman-Horn

(57) ABSTRACT

In some embodiments, the invention involves a system and method relating to software caching with bounded-error delayed updates. Embodiments of the present invention describe a delayed-update software-controlled cache, which may be used to reduce memory access latencies and improve throughput for domain specific applications that are tolerant of errors caused by delayed updates of cached values. In at least one embodiment of the present invention, software caching may be implemented by using a compiler to automatically generate caching code in application programs that must access and/or update memory. Cache is accessed for a period of time, even if global data has been updated, to delay costly memory accesses. Other embodiments are described and claimed.

23 Claims, 5 Drawing Sheets

SOFTWARE CACHING WITH BOUNDED-ERROR DELAYED UPDATE

FIELD OF THE INVENTION

An embodiment of the present invention relates generally to multiprocessor computing systems and, more specifically, to software caching in a multiprocessor or multi-core system to maintain sufficient data coherency while allowing for bounded errors.

BACKGROUND INFORMATION

Various mechanisms exist for processor optimization. Specifically, many processors are designed to use some sort of caching mechanism. Caching mechanisms exhibit problems due to memory access delays. It is often the case that increasing the capacity of a memory storage device increases the delays associated with them. Thus, accesses to larger memory result in longer delays. The memory access delays have an impact on processor execution performance. Most applications have characteristics where only a small set of accessed data is required over the execution of the program. Basically, those frequently accessed memory are brought "closer" to the processor, i.e., in hardware cache.

Some special embedded processors, for instance, an IXP network processor available from Intel Corporation, do not have hardware cache. These embedded processors may be found in cellular phones, MP3 players, and other devices. For these embedded processors, the cost of including cache on die may be prohibitive. Network processors tend to process many disparate packets of information. Each packet may be processed individually. To gain more throughput/bandwidth, the processor die may be allocated among many processor elements, where each packet may be processed by a different embedded processor. It may be preferable to have additional processors rather than implement hardware cache on these systems. It is also believed that there is less locality in network applications than in other applications. Thus, there are less "frequently used" data to be put into cache.

For general application, designers lean toward including a hardware cache rather than a software cache. In existing systems, software caching typically does not perform as well as hardware caching. Some researchers have attempted utilizing on-chip memory in conjunction with some software control. For instance, one article describes that "some digital signal processing (dsp) chips have a small, fast, on-chip memory that the programmer can use to improve access times. These on-chip memories are not caches; instead, they are located in a disjoint address space. This simplifies their implementation by eliminating any need for relating on-chip memory addresses to off-chip memory addresses, for associative lookup, and for automatic replacement. Instead, the designers make the programmer responsible for moving data between main memory and the on-chip memory in a timely and efficient way."

[See, K. D. Cooper and T. J. Harvey, "*Compiler-Controlled Memory*," In Proceedings of ASPLOS-VIII, San Jose, Calif., October 1998.] The methods discussed in this research present an alternative use for a small portion of on-chip memory as a holding place for spilled values, or a small compiler-controlled memory (CCM)."

Existing processor architectures utilize a memory hierarchy with small, but fast memory, such as caches, near the processor extending all the way to large, but slow memory, such as dynamic random access memory (DRAM) or disk drives. This design facilitates both large memory spaces while minimizing memory access latencies to frequently accessed data.

Specialized processor architectures have increasingly become important for applications with specific needs. Intel IXP processors, as discussed above, for example, may be embedded within routers to process packets. Because individual packets can be processed independently of others, one IXP processor contains many lightweight, multi-threaded micro engine (ME) cores that may be dedicated to the task of processing packets. In Intel platforms using XScale® technology, there is an Xscale® core to process control-plane code. Xscale® is an embedded microprocessor architecture derived from StrongARM technology. The software cache tries to cache data that is frequently read and infrequently written. The memory hierarchy in the IXP includes a small, but fast, local memory in each ME, and scratchpad memory, static RAM (SRAM) and DRAM memories (with increasing access latencies) shared between all the MEs.

These MEs have been designed without caches to minimize the size of each core, and because it has been believed that the packets in network applications have no spatial or temporal memory locality that would benefit from caching. This assumption arises from the notion that network processors simply read a packet once, do some work on the packet, and upon completion, simply send the packet along.

Software-controlled caching has been proposed as a way to benefit from data locality without hardware caches by utilizing the small, but fast local memory. Here, hardware cache functionality can be emulated with software routines. Software-controlled caching may be implemented with limited features to minimize software overheads. For example, cache coherency is the necessary condition to guarantee correct execution in any application where copies of the cached data in different MEs have the same values. However, in existing systems, it is expensive and inefficient to support cache coherency in software-controlled caching.

BRIEF DESCRIPTION OF THE DRAWINGS

The features and advantages of the present invention will become apparent from the following detailed description of the present invention in which.

DETAILED DESCRIPTION

Figure 1:
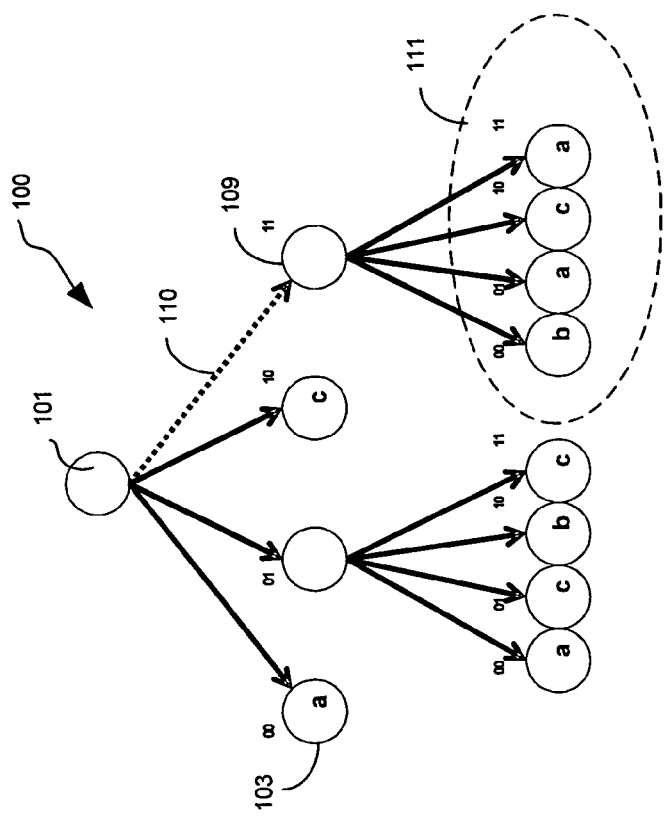
FIG. 1 illustrates an exemplary trie table for packet forwarding in network applications that may be used with embodiments of the invention.

An embodiment of the present invention is a system and method relating to software caching with bounded-error delayed updates. Embodiments of the present invention describe a delayed-update software-controlled cache, which may be used to reduce memory access latencies and improve throughput for domain specific applications that are tolerant of errors caused by delayed updates of cached values. In at least one embodiment of the present invention, software caching may be implemented by using a compiler to automatically generate caching code in application programs that must access and/or update memory. Software caching, as described herein, may yield some of the benefits of hardware caching, but without the hardware costs. One issue with hardware caches is cache coherency. This is an issue for caches when they are used in systems with more than one processor. This issue applies to desktop systems, multiprocessor systems, network processors with many processing elements, and other systems with multiple processors, such as multi-core systems. For simplicity of the following description, the use of the term multiprocessor is used to mean multiprocessor systems, network processors with many processing elements, and other systems with multiple processors, such as multi-core systems.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Cache coherency requires that for cached copies of data close to the processor, i.e., in cache or on-chip memory, it is necessary to maintain the same values as in the home or original memory location. Cache coherency is challenging when there are many processors.

Bus protocols have been developed to accommodate cache coherency with multiple processors. A modified, exclusive, shared, and invalid (MESI) protocol has been used, for instance. Cache lines may be in various states that describe how the cache exists within the multiprocessor system. For instance, a state may be "shared," meaning multiple processors are reading from the cache. The cache may be in an "exclusive" state while data is being modified by a processor. These changes are communicated to the other processors by communicating the states. These protocols are expensive in time and hardware to implement.

Hardware cache mechanisms may not be used for all processors, especially those used in embedded or specialized applications. For instance, IXP processors do not have hardware caches. These network processors are developed with multiple processors not expecting caching opportunities. Opportunities for caching may exist in these network processors, not with the packets to be processed, however, but with the application data structures. For instance, frequently used data that would be desirable to cache is routing table information.

In an embodiment, a delayed-update software controlled cache may be implemented to take advantage of caching mechanisms in multiple processor systems and systems with no hardware cache. A delayed-update may allow a processor to continue to access old data in a cache for some period of time before updated data is retrieved from memory. Applying a delayed update software-controlled cache may help optimize memory accesses. Optimizations to application code to implement embodiments of this technique may be applied manually by a programmer or through a pass in an optimizing compiler.

Delayed-update caches check for coherency regularly, but not necessarily for every related access. In a network application, for example, changes in a data structures might only be checked on every 100th or $1000^{th}$ packet. Such caching may improve memory performance from reduced memory accesses to detect changes in updates to cached values. This optimization may come at a cost in error rates. Consequentially, it should only be applied when expected error rates are small or errors are inconsequential. Since errors may result from delayed propagation of updates, low error rates would occur for data structures that are frequently read, but infrequently updated. In an optimizing compiler, according to embodiments of the present invention, results from profiling may assist in choosing data structures that have this behavior.

In the network applications, any shared global data structure that is both written to and read from, but is not protected by explicit locks may be considered a candidate for delayed update caching. Locks are often omitted in order to improve memory performance. Correctness of concurrent reads and writes to shared memory is ensured through careful coding. Synchronization is achieved implicitly from an atomic memory write. An atomic write means that a memory address (e.g. a 32-bit quantity) is always completely changed by a memory write. It is never the case that half of it is written and then the write can fail or be interrupted. The notion of atomicity of certain instructions is the basis for maintaining coherency in multiprocessor systems. In a delayed update cache, this atomic write may function as the synchronization point, with only the visibility of the update delayed.

Referring now the drawings, and in particular to FIG. 1, there is shown for an exemplary embodiment, a trie table for packet forwarding in a network application. Contrary to traditional assumptions, network applications do appear to have important locality, but the locality appears in the application data structures and not in the packets being processed. Thus, caching data structures regarding a somewhat static routing table may provide benefits. A trie table 100 for a network router is represented with nodes (circles) and connectors (arrows). A "trie" is known in the art as a kind of binary search tree. Trie terminology has been used for many years and is abbreviated from "Retrieval". The trie table 100 may define to where the packet should be sent based on looking at the source and destination addresses of the packet. For instance, node 101 is a top, or entry node. Depending on a matched string, the next node may be node 103 to match "00".

To update the trie table 100 with new routing entries 111, a new node 109 is first populated without connecting it to the live table. An update is only reflected to the live trie table when a pointer 110 to this new node 109 is written to the table. This single pointer update may act as the atomic synchronization point for the new routing entries. This is illustrated with the dotted arrow 110.

The router needs a copy of this table to determine where to send packets. This exemplary trie table may be used as a longest matching prefix table. When network packets are routed, an Internet Protocol (IP) address is used to send the packet to its destination. In a longest matching prefix table, the prefix is a string of bits and a longest string of matching bits is found to match an entry in the table. If the matching entry is not found, there is typically a default for anything that is shorter to route the packet to. The trie table may be very large when it represents IP addresses.

There may be opportunities to cache the network routing trie table in software. The top entries are frequently hit for every packet. The entire router table need not be cached, however there are advantages to caching the most frequently used portion of the table.

In packet routing, the routers may tolerate a certain error rate. Packets that are mis-routed or un-routed may be re-routed upon notification of the error. Router tables may be infrequently updated. Thus, the network router can function with older data for a short time. Network protocols are designed to tolerate these routing errors. Also, if a packet has been mis-routed, a router further down the line may have the updated information and successfully route the packet to its proper destination, thus, causing no interruption in service.

In an embodiment, the equations, as described below, may be used to control delayed updates.

$$r_{check} = fn(r_{st}, r_{ld}, r_{error})$$

$$r_{error} \leq \frac{r_{st}}{r_{ld}} \times (1 - r_{check})$$

$$r_{check} \geq 1 - \frac{r_{ld}}{r_{st}} \times r_{error}$$

In an exemplary embodiment, code may be generated in a compiler to perform coherency checks on the router table. In this embodiment, a desired error bound rate ($r_{error}$) is selected. The rate at which the tables are checked ($r_{check}$) may be known or estimated. The rate of the check is a function of the three inputs: $r_{st}$, $r_{ld}$ and $r_{error}$, where $r_{st}$ is the rate of stores, $r_{ld}$ is the rate of loads and $r_{error}$ is the maximum tolerable error rate. A "load" is data read and a "store" is data written or updated. The maximum tolerable error rate may be defined as less than or equal to the product of the rate of stores and one minus the rate of checks divided by the rate of loads. The check frequency may be defined as less than or equal to one minus the product of the maximum tolerable error rate and the rate of loads divided by the rate of stores.

These possibilities for applying delayed update caching may be identified by a compiler with inter-procedural analysis support. The inter-procedural analysis may determine global variables that are both written to and read from, and not protected by locks.

These results of the inter-procedural analysis, combined with results from memory profiling (or other analysis or monitoring mechanisms), can identify the global variables that would benefit best from delayed update caches.

In surveying popular network applications, the present inventors found many global data structures that are frequently read, but infrequently written. The reads come from the packet processing cores, but infrequent writes are generally from the user-controlled core to add new table entries or to update shared statistics. Some examples of data structures that exhibit this behavior are listed in Table 1:

TABLE 1

Applications and data structures that may benefit from delayed update caching.

| NETWORK APPLICATION | DATA STRUCTURE | DATA STRUCTURE FUNCTION |
| --- | --- | --- |
| IP packet forwarding | Trie table | Lookup table for finding the next hop for a destination IP |
| Firewall | Classification table | Deny transmission of a packet to and from a wide-area network (WAN) and a local-area network (LAN) according to user-specified rules |
| Network address translation (NAT) router | LAN-WAN translation table | Map a wide-area network (WAN) connection with a specific client and port in the local-area network (LAN) |
| Quality of service (QoS) router | Flow handling table | Configuration information for processing a user-defined flow |

These structures are often not protected with locks due to the high I/O cost of locking. Rather, they rely on atomic writes to guarantee correctness of a write update.

An observed property, which would normally be considered unconventional, is that communication of updates to cached copies can often be delayed in these structures. In domain-specific applications such as network applications, occasional errors resulting from an updated shared data structure that was not immediately propagated to cached copies can be tolerated. Examples of possible errors for the network application example are shown in Table 2. In network address translation (NAT) and packet forwarding applications, it is reasonable to assume that packets may be occasionally routed incorrectly. Flow parameters in a router with quality of service (QoS) support may deviate slightly in the short-run during update of a user-defined flow, as long as the long-run average behaves correctly.

TABLE 2

Errors introduced by using delayed update caching.

| DATA STRUCTURE | RESULTING ERROR FROM DELAYED UPDATE |
| --- | --- |
| Trie table | Some incorrectly routed packets during infrequent routing table changes |
| Firewall | No errors except on rare instances when new firewall rules are added |
| LAN-WAN translation table | No errors except on rare instances when a new connection maps to the same table entry |
| Flow handling table | Some deviation from user-defined flow parameters during reconfiguration |

As a domain of applications, network programs are typically designed to handle errors from numerous sources. In fact, packet handling errors are used implicitly in many widespread network applications. Physical-layer Ethernet must detect errors to identify packet collisions. The transfer control protocol (TCP) is a connection-oriented protocol that requires acknowledgements (ACKs) of sent packets by the receiver to guarantee that the packets reached the receiver (See, for instance, W. R. Stevens, "TCP/IP Illustrated Vol. 1", Addison-Wesley, 1994). Failure to receive ACKs by the sender results in retransmission of unacknowledged packets. QoS routers (through scheduling and metering algorithms)

explicitly drop packets to allocate bandwidth to predefined flows (See, for instance, S. Floyd and V. Jacobson, "Random Early Detection Gateways for Congestion Avoidance," IEEE/ACM Transactions on Networking, August, 1993).

Figure 2:
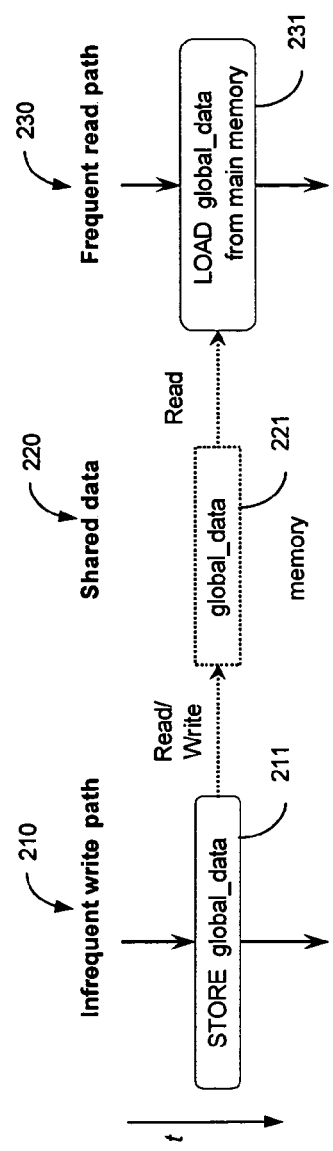
FIG. 2 illustrates an un-optimized access to share global data.

FIG. 2 shows an un-optimized access to shared global data. The infrequent write path 210 updates the routing table which is in shared data 220. The frequent read path 230 is performed by each of the packet processors when processing a packet. Every packet that is to be routed causes an access to the table structure in shared memory. In an example, when a routing table is updated, global_data 221 is stored (211) into the global_data 221 shared data area 220. When the routing table is read (231) by an application, the shared data is retrieved from global_data 221.

Figure 3:
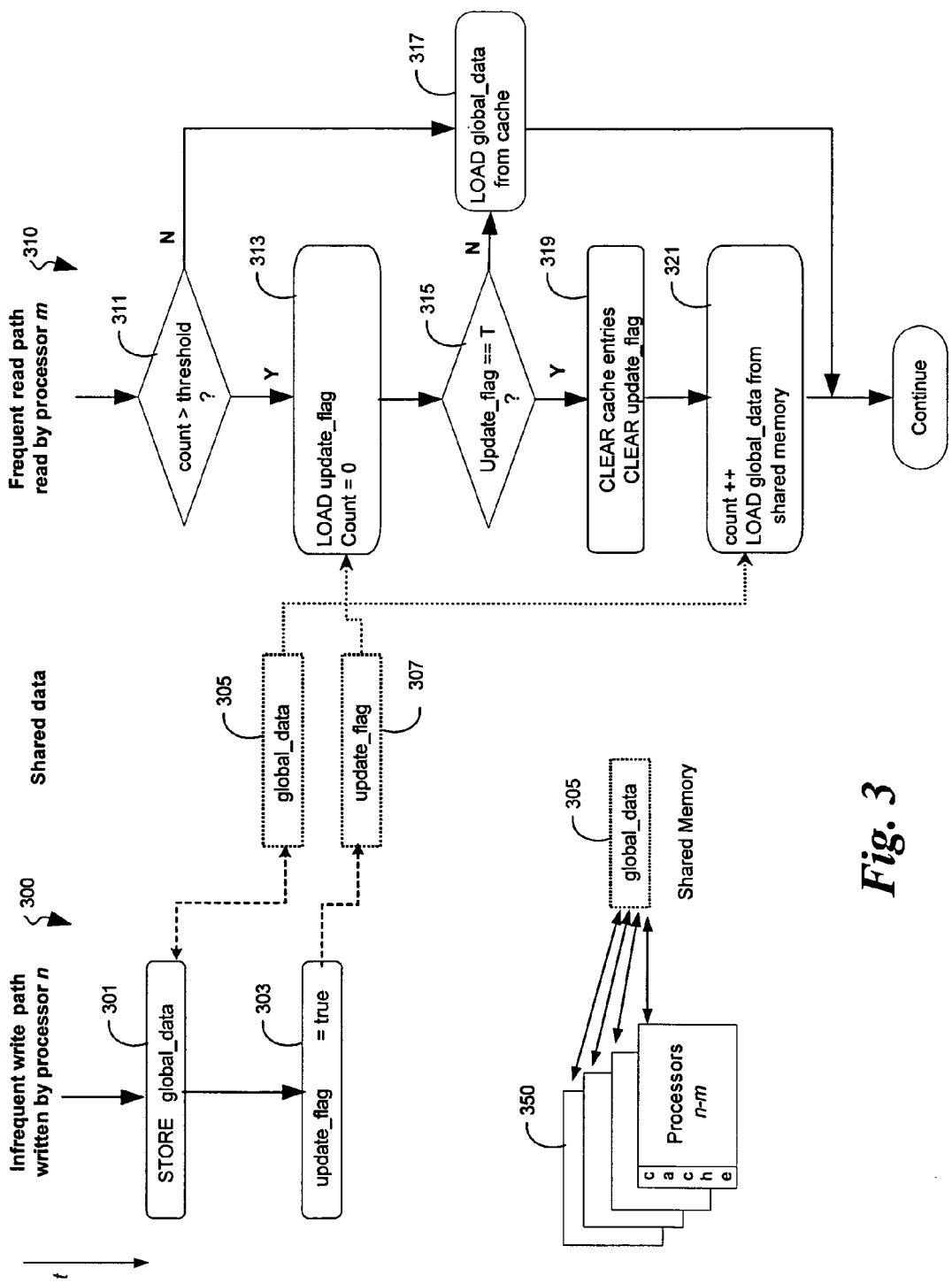
FIG. 3 is a flow diagram for optimized access of software cache, according to embodiments of the invention.

FIG. 3 shows a block and flow diagram for an optimized access sequence illustrating how cache coherence may be relaxed to delay-tolerant global data to improve memory performance, according to an embodiment of the invention. Embodiments of the invention are designed to perform with multiple processors 350 accessing shared data. These processors may be multiprocessor systems, network processors with many processing elements, and other systems with multiple processors, such as multi-core systems. Global_data 305 may be shared among processors 350 in multi-processor and multi-core systems. In this Figure, solid vertical arrows indicate temporal execution of the read/load and write/store modules. Dotted arrows going across indicate access to shared data by the read and write modules. In an embodiment of the present invention, updates on the data occur infrequently compared to access of the data. When the data is updated in the infrequent write path 300 by processor n, the updated data may be stored 301 in shared memory as global_data 305. An update_flag may then be set to true 303 and stored in shared memory 307.

A network process may continue to access the required data from cache several times before checking for updates. This is possible because the application can tolerate some error rate. A local counter, count is used to keep track of accesses to a data structure. The read path 310 of processor m determines if count is greater than a specified threshold (threshold) 311. If so, then count is reset to zero (313). The update_flag 307 is loaded from shared memory, or other designated location. In an embodiment, the update_flag resides in a system register. In another embodiment, the update_flag is set with a control line. If the global_data has been updated, as determined in 315, then the cache is cleared in 319. The update_flag is also cleared. The count may then be incremented in 321 and the updated data is loaded from shared memory. If the count is not greater than threshold, as determined in 311, or if there have been no updates (update_flag equal to False), as determined in 315, then the data is simply loaded from cache 317, if available. If the data is not currently in cache, traditional methods may be used to automatically retrieve the data from shared memory.

It will be apparent to one of ordinary skill in the art that processors n and m may be the same processor. In other words, there may be times during updates performed by processor n in the infrequent write path that processor m performing a read from global_data is in fact the same processor.

It will be apparent to one of ordinary skill in the art that policies on when frequently read data are placed into cache memory need not be modified to accommodate embodiments of the present invention. Global_data to be protected using an update_flag may be an entire data structure, or a portion of a data structure. At any time, the protected data structure, or portion thereof, may be in shared memory, or additionally in cache. Memory may include a software handler to control whether data is retrieved from memory or retrieved from cache. In an embodiment, the additional code for setting an update_flag and inserting a loop to check for the threshold may be inserted into the network code during compilation time.

Cache may have a tag array and actual lines or values. A tag array contains addresses. When a cached value is requested for an address, the tag array is checked for a matching address. If there is a match in the tag array, the line is pulled from cache. Otherwise it is necessary to go to main memory to retrieve the data. An item may then be removed from cache to make room for the recently retrieved data. For a hardware cache, this process is performed with control lines. With a software cache, a software handler controls access to cache, rather than hardware. The application code that is to access memory is compiled to insert the additional lines of code, as above. Each time the source code indicates a LOAD, the check threshold loop, as described in 310, is inserted into the executable code. Each time a STORE is indicated, the compiler will insert code to set the update_flag, as described in 300. The compiler is customized with an indication of where the update_flag is located, so the appropriate code may be generated. The threshold may also be determined and made known to the compiler so that the loop may be generated with a desired threshold. A default threshold value may be hard-coded in the compiler and optionally overwritten. In embodiments, the threshold may be a dynamic variable that may be set on-the-fly and retrieved as the code is executing. The threshold may reside in memory, or a system register or any other location accessible to the application code during runtime. Thus, if an operator determines that the error rate is too high, the threshold may be lowered without taking the system off-line.

Figure 4:
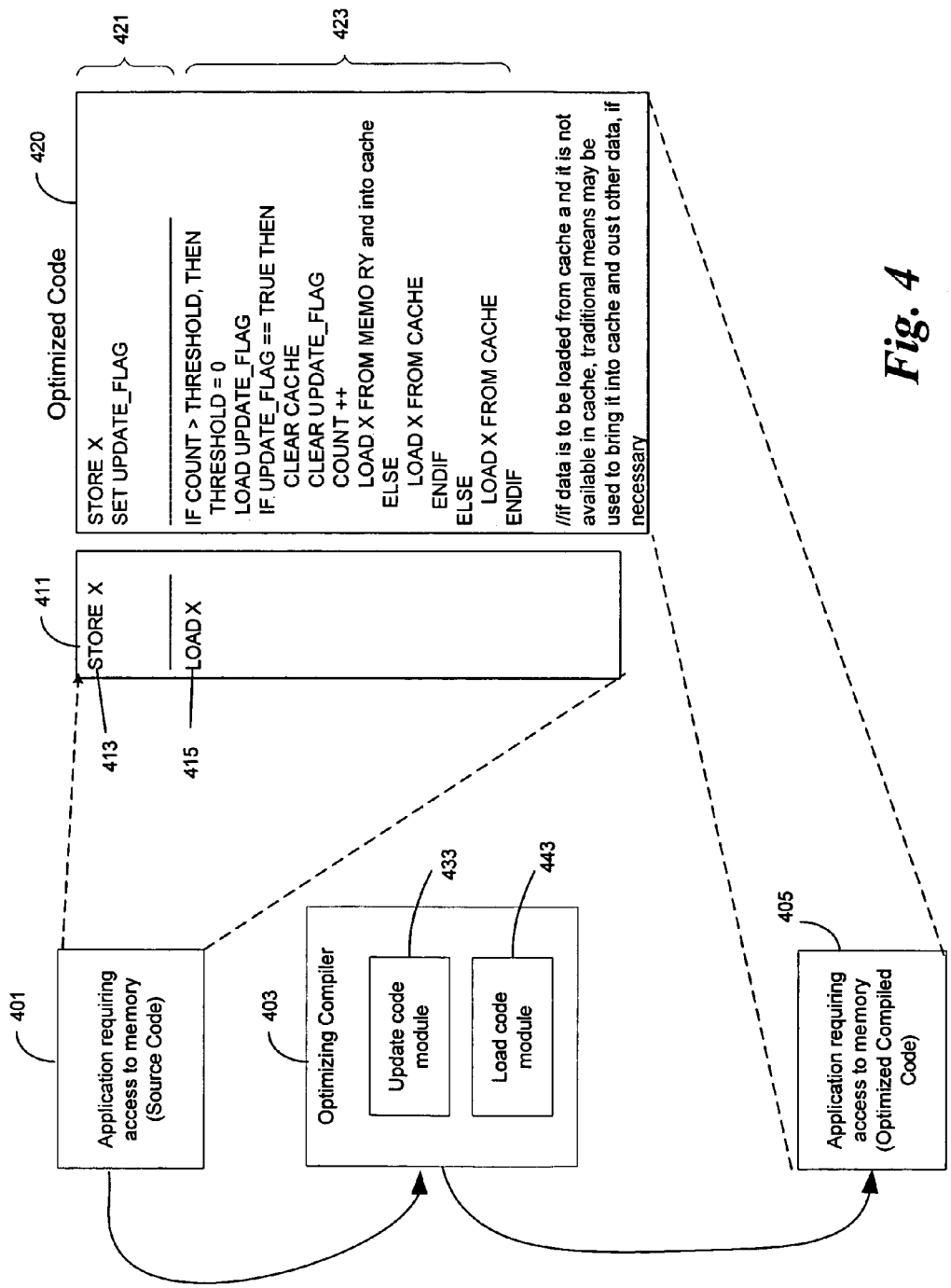
FIG. 4 is a block diagram of an exemplary system for optimizing application code, according to embodiments of the invention.

FIG. 4 is a block diagram illustrating an exemplary system for optimizing the application code, according to embodiments of the invention. An update-delay error-tolerant application requiring optimization 401 may have source code 411 with STORE 413 and LOAD 415 instructions for updating and accessing global_data. The application source code is compiled by an optimizing compiler 403 to generate the optimized executable 405. In an embodiment, the optimizing compiler may have an update code generation module 433 for generating the update code when a STORE instruction is identified, and a load code generation module 443 for generating the expanded load code when a LOAD instruction 415 is identified. It will be apparent to one skilled in the art that the optimizing compiler may be implemented with the modules for update and load code generation combined into one module, or they may be implemented in separate modules.

In an embodiment, the update code generation module 433 and load code generation module 443 identify STORE 413 and LOAD 415 instructions in the original application code. The STORE 413 instruction and LOAD 415 instruction are compiled to include additional instructions to handle cache coherence and update delays in the optimized code 420. The STORE instruction may be expanded to include both a STORE instruction and SET update_flag instruction 421. A LOAD instruction may expand to compiled code equivalent to the loop 423, as described for FIG. 3 (310).

Figure 5:
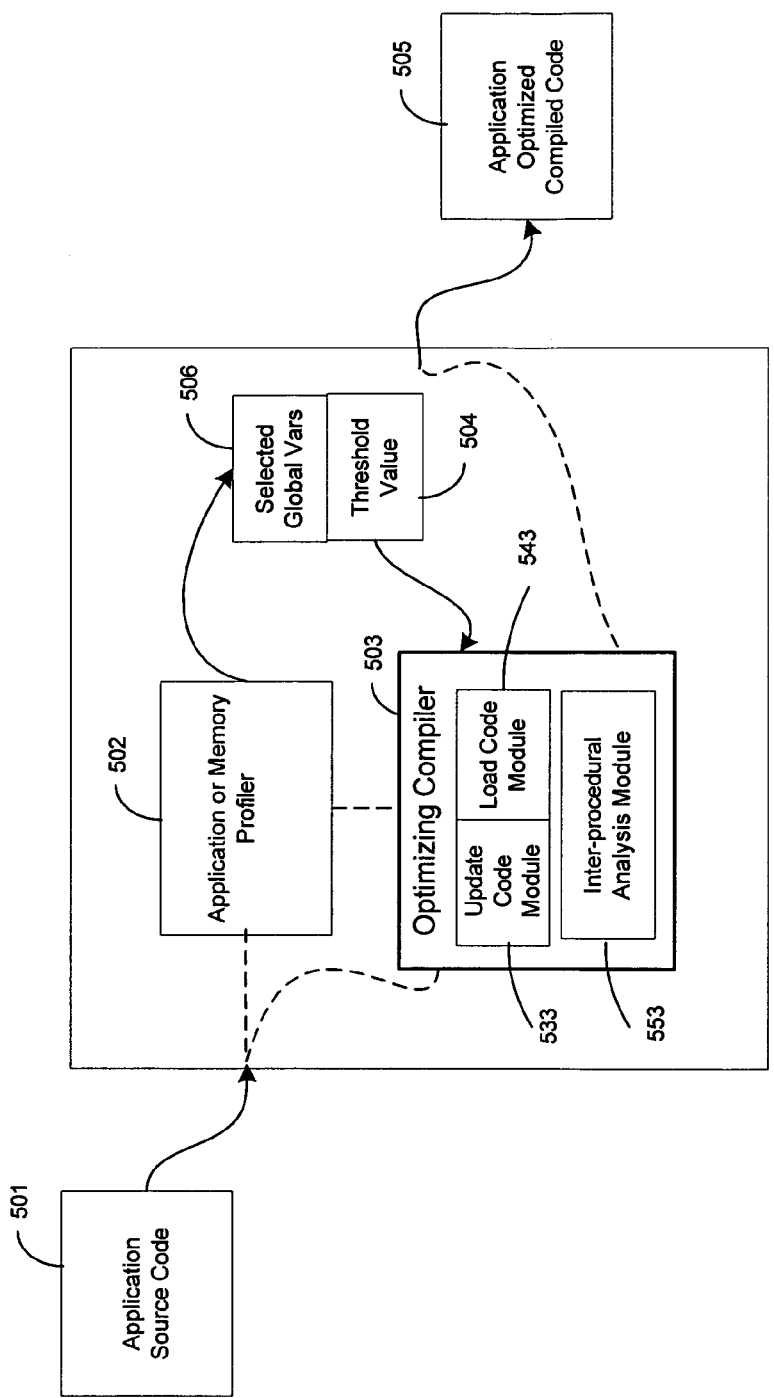
FIG. 5 is block diagram of an exemplary system for optimizing application code using an application profiler, according to an embodiment of the invention.

FIG. 5 is a block diagram illustrating an exemplary system for optimizing the application code using an application profiler, according to embodiments of the invention. Application source code 501 may be passed through a memory or application profiler 502. In some embodiments, a memory profiler may be part of the optimizing compiler 503. The profiler may perform analysis to help determine which frequently used data should be subject to update-delays. In an embodiment, an application profiler determines which global variables 506 are best put into shared memory, i.e., frequently accessed and infrequently updated. The profiler may also determine a reasonable threshold value 504. In embodiments, the threshold value 504 may be based on tolerable error rates, loads and stores in the application code, and may be determined off-line, or be dynamically selectable rather than determined by the application profiler. The global variable selections 506 and threshold information 504 may be fed to the optimizing compiler 503. The application source code 501 is passed through the optimizing compiler 503 to generate optimized compiled code 505. In an embodiment, the optimizing compiler comprises an update code generation module 533 and a load code generation module 543, as discussed in conjunction with FIG. 4.

In an embodiment, the optimizing compiler further comprises an inter-procedural analysis module 553. In some embodiments the optimizing compiler further comprises machine-independent global optimizations, loop-nest optimizations, and/or code generation (not shown). The results from the inter-procedural analysis module 553 may be combined with results from memory profiling 502 (or other analysis or monitoring mechanisms), to identify the global variables that would benefit best from delayed update caches. The inter-procedural analysis may determine global variables that are both written to and read from, and not protected by locks. The threshold value 504 may be updated dynamically during runtime, or may be static.

It will be apparent to one of ordinary skill in the art that embodiments of the described system and method may be used for applications other than network routing. For instance, an embodiment may be used for screen or display rendering. In some cases, it may be acceptable to tolerate a positive error rate in graphics or other screen elements in a computing system. In this case, a user may see a non-updated pixel or screen portion for a short period of time until the data update flag is checked. This screen portion may not be important to the operation of application programs on the computing system. Other embodiments in error tolerant applications may be implemented.

In an embodiment, if the threshold is set to zero, then the update flag is checked on each pass through the processing loop. Applications that are found to be less error tolerant may have the threshold set at this level. In some embodiments, the threshold may be set and reset to various values at predetermined times during the day, or week to accommodate expected traffic and updates. Other applications that are less error tolerant may also be implemented using the described system and method. For instance, applications that weight the importance of calculations so that important calculations are performed first when under stress may drop unimportant calculations that are prone to errors in cache retrieval and perform the more important calculations first. This may be a viable trade-off between performance and error rates during times of computational stress.

In an embodiment, there is one shared memory unit for a given data block and each processor has its own on-board cache. In another embodiment, only a subset of processors have on-board cache. Those processors without on-board cache will access main (shared) memory each time an access is required.

Figure 6:
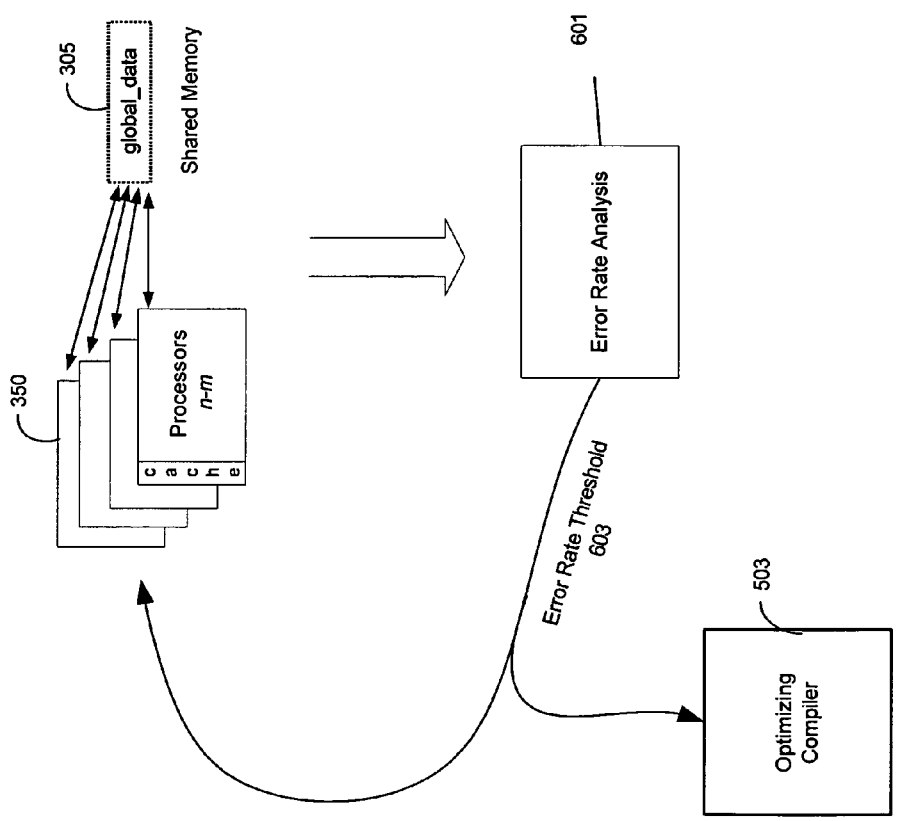
FIG. 6 is a block diagram illustrating error rate analysis performed at runtime, according to an embodiment of the invention.

FIG. 6 is a block diagram illustrating dynamic updating of the threshold based on error analysis. In an embodiment of the invention, an error rate analysis module 601 operates at runtime. The error rate analysis module 601 may capture metrics associated with errors related to processors 350 utilizing cache data that is out of synchronization with shared memory 305. If the error rate is determined to be too high (or too low), the error rate analysis module may automatically update the threshold 603 used in the optimized application code. The threshold 603 may be a run-time variable available immediately to the optimized application code running on the processors 350. In other embodiments, error analysis may be performed manually. In further embodiments, the application code may need to be recompiled and re-optimized, if the threshold is hard-coded in the compiler. In another embodiment, the threshold 603 may be automatically sent to the optimizing compiler 503 as input for the next compilation.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include one or more processors, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for software caching with delayed update and bounded error, comprising:

a system comprising a plurality of processor elements, each processor element executing optimized application instructions, wherein each processor element is communicatively coupled to main memory and cache memory;

an optimized update module to update a portion of the main memory, wherein updating sets an update flag to indicate a change in the portion of main memory; and an optimized load module to retrieve the portion of main memory, wherein the update flag is to be checked at periodic intervals before retrieving the portion, and wherein the portion is to be retrieved from cache, if available, until the update flag indicates a change and the periodic interval is reached, wherein the portion of memory is selected based on results of inter-procedural analysis of pre-optimized application instructions.

2. The system as recited in claim 1, wherein a threshold identifies a maximum number of loads to be performed prior to checking the update flag.

3. The system as recited in claim 2, wherein the threshold is to be determined by an application profiler.

4. The platform as recited in claim 2, wherein the threshold is dynamically updated during runtime.

5. The platform as recited in claim 4, wherein the threshold resides in one of memory, a system register, or another location accessible to application code during run-time.

6. The platform as recited in claim 1, wherein the system comprises a multi-processor platform comprising one of a multi-processor, multi-core or multi-processor and multi-core platform.

7. A multi-processor platform for software caching with delayed update and bounded error, comprising:

a system comprising a plurality of processor elements, each processor element executing optimized application instructions, wherein each processor element is communicatively coupled to main memory and cache memory;

an optimized update module to update a portion of the main memory, wherein updating sets an update flag to indicate a change in the portion of main memory; and an optimized load module to retrieve the portion of main memory, wherein the update flag is to be checked at periodic intervals before retrieving the portion, and wherein the portion is to be retrieved from cache, if available, until the update flag indicates a change and the periodic interval is reached, wherein a threshold is to be determined by an application profiler and identifies a maximum number of loads to be performed prior to checking the update flag, and wherein the threshold is a function of a number of loads and a number of stores in the optimized instructions prior to being optimized, and a maximum tolerable error rate.

8. A method for software caching with delayed update and bounded error, comprising:

responsive to a change in a selected portion of data, updating the selected portion of data in shared memory by an optimized application, wherein the updating further comprises setting a flag indicating an update has occurred, wherein the optimized application is an application optimized by a compiler to relax cache coherence of delay-tolerant global data by allowing a tolerable error rate to permit limited retrieval of older data from non-updated cache, thereby improving memory performance; and loading the selected portion of data, wherein the selected portion is retrieved from cache unless both the update flag indicates an update has occurred and selected threshold has been reached, wherein the selected threshold is based on the tolerable error rate, and wherein when the update flag indicates an update has occurred and the selected threshold has been reached, the selected portion is retrieved from main memory.

9. The method as recited in claim 8, wherein the selected threshold identifies a maximum number of loads to be performed prior to checking the update flag.

10. The method as recited in claim 9, further comprising determining the threshold by an application profiler.

11. A method for software caching with delayed update and bounded error, comprising:

responsive to a change in a selected portion of data, updating the selected portion of data in shared memory by an optimized application, wherein the updating further comprises setting a flag indicating an update has occurred;

loading the selected portion of data, wherein the selected portion is retrieved from cache unless both the update flag indicates an update has occurred and a selected threshold has been reached;

determining the selected threshold by an application profiler; and when the update flag indicates an update has occurred and the selected threshold has been reached, retrieving the selected portion from main memory, wherein the selected threshold identifies a maximum number of loads to be performed prior to checking the update flag, wherein the threshold is a function of a number of loads and a number of stores in the optimized application prior to being optimized, and a maximum tolerable error rate.

12. A method for software caching with delayed update and bounded error, comprising:

responsive to a change in a selected portion of data, updating the selected portion of data in shared memory by an optimized application, wherein the updating further comprises setting a flag indicating an update has occurred; and loading the selected portion of data, wherein the selected portion is retrieved from cache unless both the update flag indicates an update has occurred and a selected threshold has been reached, wherein when the update flag indicates an update has occurred and the selected threshold has been reached, retrieving the selected portion from main memory, wherein the portion of data is selected based on results of inter-procedural analysis of pre-optimized application instructions.

13. A machine accessible storage medium having instructions stored therein for software caching with delayed update and bounded error that when accessed cause the machine to:

respond to a change in a selected portion of data by updating the selected portion of data in shared memory, wherein the updating further comprises setting a flag indicating an update has occurred, wherein the optimized application is an application optimized by a compiler to relax cache coherence of delay-tolerant global data by allowing a tolerable error rate to permit limited retrieval of older data from non-updated cache, thereby improving memory performance; and load the selected portion of data, wherein the selected portion is retrieved from cache unless the both update flag indicates an update has occurred and a selected threshold has been reached, wherein the selected threshold is based on the tolerable error rate, and wherein when the update flag indicates an update has occurred and the selected threshold has been reached, the selected portion is retrieved from main memory.

14. The medium as recited in claim 13, wherein the selected threshold identifies a maximum number of loads to be performed prior to checking the update flag.

15. The medium as recited in claim 14, wherein the instructions further cause the machine to determine the threshold by an application profiler.

16. A machine accessible storage medium having instructions stored therein for software caching with delayed update and bounded error that when accessed cause the machine to:

respond to a change in a selected portion of data by updating the selected portion of data in shared memory, wherein the updating further comprises setting a flag indicating an update has occurred; and load the selected portion of data, wherein the selected portion is retrieved from cache unless the both update flag indicates an update has occurred and a selected threshold has been reached, wherein when the update flag indicates an update has occurred has occured and the selected threshold has been reached, the selected portion is retrieved from main memory, wherein the threshold is a function of a number of loads and a number of stores in the optimized application prior to being optimized, and a maximum tolerable error rate.

17. A machine accessible storage medium having instructions stored therein for software caching with delayed update and bounded error that when accessed cause the machine to:

respond to a change in a selected portion of data by updating the selected portion of data in shared memory, wherein the updating further comprises setting a flag indicating an update has occurred; and load the selected portion of data, wherein the selected portion is retrieved from cache unless the both update flag indicates an update has occurred and a selected threshold has been reached, wherein when the update flag indicates an update has occurred and the selected threshold has been reached, the selected portion is retrieved from main memory, wherein the portion of data is selected based on results of inter-procedural analysis of pre-optimized application instructions.

18. A platform for software caching with delayed update and bounded error, comprising:

a system comprising a plurality of processor elements, each processor element executing optimized application instructions, wherein each processor element is communicatively coupled to main memory and cache memory, wherein application instructions are optimized by a compiler to relax cache coherence of delay-tolerant global data to allow a tolerable error rate to permit limited retrieval of older data from non-updated cache, thereby improving memory performance;

an optimized update module to update a portion of the main memory, wherein updating sets an update flag to indicate a change in the portion of main memory; and an optimized load module to retrieve the portion of main memory, wherein the update flag is to be checked at periodic intervals, based on the tolerable error rate, before retrieving the portion, and wherein the portion is to be retrieved from cache, if available, until the update flag indicates a change and the periodic interval is reached, even if retrieval from cache results in older, out-dated data.

19. The platform as recited in claim 18, wherein a threshold identifies a maximum number of loads to be performed prior to checking the update flag.

20. The platform as recited in claim 19, wherein the threshold is to be determined by an application profiler.

21. The platform as recited in claim 19, wherein the threshold resides in one of memory, a system register, or another location accessible to application code during run-time.

22. The platform as recited in claim 18, wherein the portion of memory is selected based on results of inter-procedural analysis of pre-optimized application instructions.

23. The platform as recited in claim 18, wherein the multi-processor platform comprises one of a multi-processor, multi-core or multi-processor and multi-core platform.

* * * * *